US009520040B2

(12) United States Patent
Mavromatis

(10) Patent No.: US 9,520,040 B2
(45) Date of Patent: Dec. 13, 2016

(54) SYSTEM AND METHOD FOR REAL-TIME 3-D OBJECT TRACKING AND ALERTING VIA NETWORKED SENSORS

(75) Inventor: Theofanis Mavromatis, Manhattan Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 1565 days.

(21) Appl. No.: 12/394,029

(22) Filed: Feb. 26, 2009

(65) Prior Publication Data

US 2010/0128110 A1  May 27, 2010

Related U.S. Application Data

(60) Provisional application No. 61/117,091, filed on Nov. 21, 2008.

(51) Int. Cl.
*H04N 13/02* (2006.01)
*H04N 7/18* (2006.01)
*G08B 13/196* (2006.01)
*G06T 7/20* (2006.01)

(52) U.S. Cl.
CPC ....... *G08B 13/19641* (2013.01); *G06T 7/2093* (2013.01); *H04N 13/0242* (2013.01); *G06T 2207/30232* (2013.01); *G06T 2207/30241* (2013.01)

(58) Field of Classification Search
CPC .... H04N 7/181; H04N 7/188; G08B 13/19656

USPC .................................................. 348/143, 47
See application file for complete search history.

(56) References Cited

U.S. PATENT DOCUMENTS

| 6,696,945 | B1 | 2/2004 | Venetianer et al. | |
|---|---|---|---|---|
| 6,970,083 | B2 | 11/2005 | Venetianer et al. | |
| 7,613,324 | B2 | 11/2009 | Venetianer et al. | |
| 7,868,912 | B2 | 1/2011 | Venetianer et al. | |
| 2004/0075738 | A1* | 4/2004 | Burke et al. | 348/143 |
| 2005/0012817 | A1* | 1/2005 | Hampapur et al. | 348/143 |
| 2005/0104961 | A1* | 5/2005 | Han et al. | 348/143 |
| 2006/0279630 | A1* | 12/2006 | Aggarwal et al. | 348/143 |
| 2008/0018738 | A1* | 1/2008 | Lipton et al. | 348/143 |

* cited by examiner

*Primary Examiner* — Phuoc Nguyen
*Assistant Examiner* — Kishin G Belani
(74) *Attorney, Agent, or Firm* — Lewis Roca Rothgerber Christie LLP

(57) ABSTRACT

The invention is an integrated system consisting of a network of two-dimensional sensors (such as cameras) and processors along with target detection, data fusion, tracking, and alerting algorithms to provide three-dimensional, real-time, high accuracy target tracks and alerts in a wide area of interest. The system uses both target kinematics (motion) and features (e.g., size, shape, color, behavior, etc.) to detect, track, display, and alert users to potential objects of interest.

20 Claims, 16 Drawing Sheets

SYSTEM AND METHOD FOR REAL-TIME 3-D OBJECT TRACKING AND ALERTING VIA NETWORKED SENSORS

CROSS-REFERENCE TO RELATED APPLICATION(S)

This application claims the benefit of U.S. Provisional Application No. 61/117,091, filed Nov. 21, 2008, herein incorporated by reference.

BACKGROUND OF THE INVENTION

Field of the Invention

This invention relates to real-time three-dimensional (3-D) object tracking and alerting using networked overlapping two-dimensional (2-D) sensors to observe objects and image processing (IP) tools to detect and track the moving objects.

Description of Related Art

Physical perimeter security is an ever-growing and challenging problem. Human observation of sensor displays can be quickly overtaxing. Most physical perimeter security systems use closed circuit television, monitored continuously by security personnel.

There is a need for enhanced physical perimeter security, particularly the automated tracking of threatening objects, and especially the simultaneous tracking of multiple ground, surface (water), and airborne targets with high precision and in three dimensions. The migration from analog to digital cameras, the networking of these digital cameras, and the use of video analytics to assist the monitoring security personnel makes meeting this need more possible. This technology has many uses, including physical perimeter security, military asset protection, border control, and traffic applications.

Prior attempts using passive cameras merely involve two-dimensional (2-D) image processing. These prior attempts do not use triangulation methods with overlapping coverage from multiple cameras. Instead, they use complementary camera coverage, which fails to resolve target range adequately. As a result, the target tracks, if even possible, tend to be highly erroneous. An attempt to solve this problem by using an accurate terrain map of the camera field-of-view and using the camera-to-target vector to find its "piercing point" on the terrain could be adequate in limited cases (e.g., high target "grazing" angles). Even then, these systems cannot provide airborne target tracks without triangulation because the "terrain piercing" approach is no longer applicable.

Due to these limitations, alert generation using current methods works only on very simple target behaviors, such as crossing a line on a 2-D representation of the area under surveillance. Such alerts result in uncertainty that hinders effective countermeasures and interdiction. In fact, since the 2-D "line" is actually a 3-D "plane," nearby objects of no significance (such as birds) may accidentally set off the alert, thus triggering a false alarm. Another way to create 3-D tracks is with active radar capable of providing range, range rate, azimuth, and elevation observations, but no passive electro-optical/infrared system currently has this capability.

Competing systems are limited to analog or IP-based sensors and detection software. Most cannot track ground (terrestrial) or surface (on water) targets and even those that can lack precision and require extensive knowledge of the terrain involved. None can track airborne targets. Most use alert rules based on image analysis, e.g., (1) trip wire (setting off an alert based on an image crossing a predefined line), (2) object left behind (one object enters, then departs leaving a stationary object behind), (3) object removed (one object enters, then departs after taking a stationary object), (4) counting (e.g., people, cars). These lack airborne tracking ability and at best have only limited ground tracking ability.

Traditional fixed camera systems use a few wide field-of-view (FOV) cameras with minimum coverage overlap. There is limited tracking capability, and only for ground targets, but the cameras are not very expensive. Alternatively, a fewer number of (usually) higher-priced pan-tilt-zoom (PTZ) cameras can provide some visual tracking capability (through panning) and target identification (through zoom), but require subjective selection of targets with potential coverage loss as a result.

Thus, there exists a need for a system and method for real-time three-dimensional detection, tracking, and alerting of moving objects using conventional sensors, especially passive ones.

SUMMARY OF THE INVENTION

The system and method of the invention detect and track multiple objects in real time. With the help of image processing techniques, the system fuses observations (e.g., kinematics (motion), color, thermal signature, size, shape, classification, behavior, etc.) from multiple overlapping 2-D sensors to track objects in 3-D. The system tracks land, surface (water), and airborne threats simultaneously. The invention bases its rules off the object's state in 3-D space (e.g., time, position, velocity, acceleration) as well as the object's features, which can include simple attributes (such as size, shape, color, or luminance) or complex behaviors or intentions (such as entering a building or crossing a street) as detected over several observations.

One embodiment uses a large number of inexpensive wide-area cameras or camera stations (multiple cameras in the same location with complementary wide-area coverage). These provide both continuous coverage and high coverage redundancy. In addition, a few PTZ cameras (which typically cost more) help with target identification. Known geo-registered landmarks and sensor locations help calibrate the sensors. There are virtually no coverage holes since the numerous wide-area cameras usually provide continuous observation of potential targets. Coverage can be 24/7 using visual and infrared cameras. Coverage is scalable and expandable with additional sensors. There is an intuitive user interface for fast decision-making and countermeasure deployment.

The alert system attempts to replace the human operator from having to monitor the screens constantly. While simple monitors can detect certain basic changes in the sensor image (say, an object "crossing over" an imaginary line), these are limited to 2-D representations, and so false alarms can be frequent (which leads to ignoring them, along with true alarms). One embodiment can overcome such a limitation by programming the system to recognize 3-D landscape and trigger alerts, such as when an object recognized as a human (by, for example, size, shape, behavior over several images, etc.) actually crosses a particular plane in 3-D space. This greatly reduces false alarms and operator fatigue caused by trying to accomplish the same process through visual inspection. Note that several factors go into determining a useful detection range, such as the minimum detectable object size; sensor field of view, resolution, and sensitivity; environment; and weather.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

The basic approach in an exemplary embodiment is to position numerous 2-D sensors (e.g., cameras) with overlapping wide-area fields of view so that multiple cameras observe each area of interest. First, the sensors are calibrated to map their 2-D images to specific vectors in 3-D space (e.g., each pixel on a camera image corresponds to a precise vector or line emanating from the camera in 3-D). With the help of image processing techniques, the sensors not only detect movement (kinematics), they can also detect features (such as color, size, shape, thermal signature, classification, behavior, etc.). Some of these (like motion, action, behavior, and intention) require several observations in order to detect.

The sensors are also time-synchronized and networked so that their images can be combined with those of the other sensors, enabling an object entering an area of interest to be tracked in 3-D by combining the images (kinematics and features) of multiple sensors through multisensor fusion. Finally, particular behaviors of interest (that is, combinations of motion and features, such as a white car crossing a certain intersection) can be specified to the alerting processor to enable more sophisticated (i.e., practical) alerts to be generated to corresponding security personnel.

Figure 1:
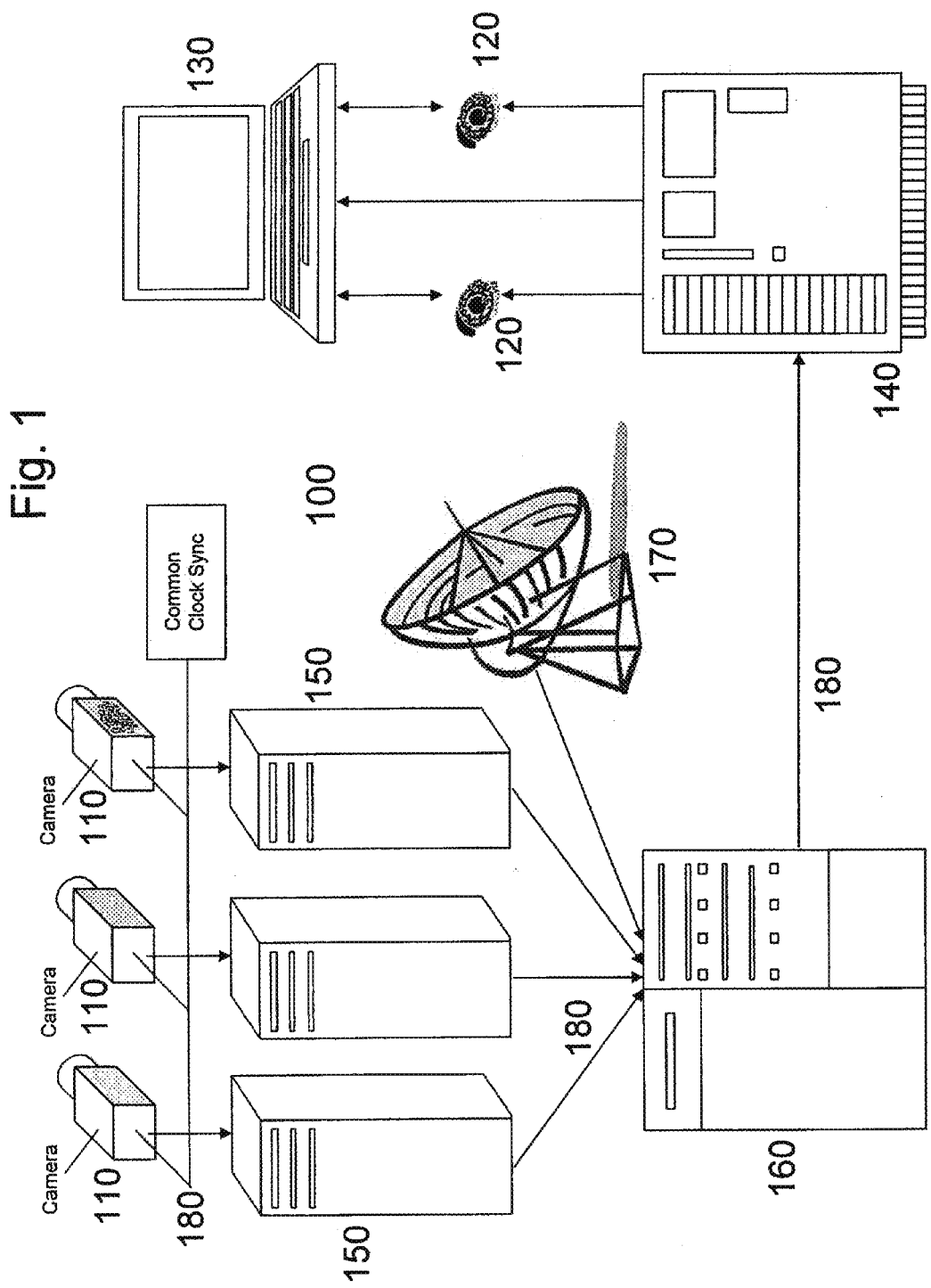
FIG. 1 is a hardware block diagram illustrating the components of an embodiment of the present invention.

FIG. 1 illustrates the components of an embodiment of the 3-D tracking and alerting system 100 using multiple networked 2-D sensors 110 with overlapping field of view (FOV). For example, the 2-D sensors 110 can be 180° electro-optical/infrared camera platforms. Each such camera platform could be either a single camera having a wide FOV or several narrower FOV cameras with complementing FOVs that together provide wide coverage. In addition, one or more PTZ cameras 120 can provide object identification. The PTZ cameras are operated manually through an operator input 130 or automatically through a behavior analysis and alert processor 140 to track objects already identified by the system (through a user-friendly interface, such as a touch screen).

The 2-D sensor 110 records images, including those caused by an object's appearance in the sensor's FOV. Given the sensor's orientation, this enables a corresponding image-processing device 150 to locate an object's center by azimuth and elevation. Combining two such readings from different 2-D sensors 110 of the same object allows pinpointing the object's 3-D location through triangulation. Combining the location with the object information (e.g., size, shape, color, behavior over multiple images, etc.) obtained from the multiple sensors produces an accurate estimate of the object's motion and attributes (features).

Each 2-D sensor 110 collects periodic time-synchronized images of its field of view. Processing these images detects the possible objects of interest. For instance, an image processing (IP) detection processor 150 interprets camera images into their corresponding objects. This takes place using conventional IP means and morphological operations such as erosion (contraction of the outer surface of the image), dilation (expansion of the outer surface of the image), opening (erosion, followed by dilation, which deletes spurious data), and closing (dilation, followed by erosion, which fills in missing data). See, for example, U.S. Provisional Application No. 61/117,091, which is incorporated by reference. This interpreting also takes place using other techniques including object and behavior (motion) recognition.

The detection processor 150 can be dedicated to a particular sensor (even built into the sensor) or several sensors may share the same detection processor. The detection processor may also be a component (e.g., a software component comprising several concurrently running programs) of another processor. The detection processor determines the azimuth and elevation angles of the objects relative to the positions of the corresponding sensors. The processor also detects certain distinguishing "features" (e.g., classification, size, color, shape, thermal signature, behavior, etc.).

The detection data from each of the sensors 110 then goes to a tracking processor 160. Again, the tracking processor 160 can be a dedicated processor or processors or shared with other programs on a single processor or processors. Optionally, other sensors (such as 3-D radar 170) data can be directly fed to the tracking processor 160 to assist in the 3-D tracking and associated feature determination by the tracking processor 160.

The tracking processor 160 combines the output of all the detection processors 150 and optional other sensors 170 to form "tracks" representing the 3-D paths (over time) of the objects as well as the 3-D features of the objects. Conventional means such as multiple hypothesis tracking (MHT) can implement the 3-D tracking. For a discussion of MHT, see Samuel Blackman, *Design and Analysis of Modern Tracking Systems*, Chapter 16 (Artech House Publishers, 1999), the entire text of which is hereby incorporated by reference for all purposes.

The 3-D tracking and feature data produced by the tracking processor 160 is then input to the behavior analysis and alert processor 140 which analyzes the objects' behaviors and generates appropriate alerts (e.g., to the operator display 130 or by cueing a PTZ camera 120) when such behavior is identified as a behavior of interest. As described above in relation to the tracking processor 160, the behavior analysis and alert processor 140 need not be a dedicated processor. Other processors or programs (implemented on one or more processors) may share its role. All of the sensors, processors, and displays in the tracking system 100 can be interconnected via a network 180 and operate in real time.

Figure 2:
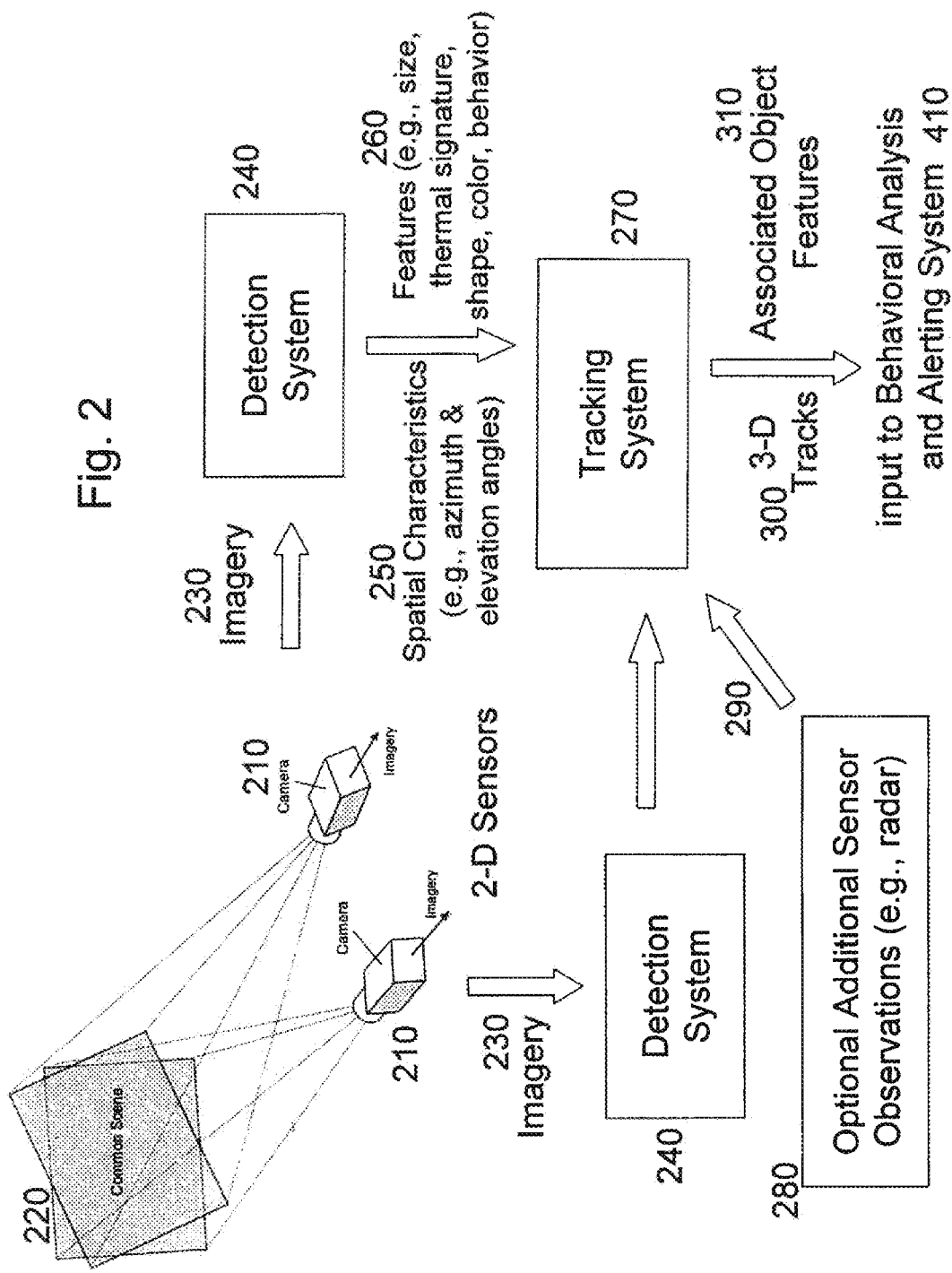
FIG. 2 is a functional block diagram illustrating an embodiment of the fusion process of the invention, from 2-D sensing to 3-D tracking and feature detection.

The present invention tracks in three dimensions by correlating multiple 2-D sensors with overlapping fields of view using a technique known as multisensor fusion. For purposes of this disclosure, a 2-D sensor is any sensor that can provide a vector from the sensor to the target (that is, direction, but not distance). FIG. 2 shows the multisensor fusion process in more detail. It assumes a simple configuration of two spatially separated cameras 210 with a large overlapping field of view 220.

These cameras can be any suitable type, e.g., electro-optical, infrared, etc., and there can be more than two. They also need not be of the same type. In fact, they can be any 2-D sensor that can provide a vector from the sensor to the target, whether passive or active. Perfect overlap is not required, but in one embodiment, every location of interest should fall in the FOV of at least two 2-D sensors in order to perform accurate 3-D tracking at that location. Overlap from more than two 2-D sensors enhances the accuracy of the 3-D tracking as well as the redundancy of the system.

The system knows the location of each camera 210 as well as its respective reference origins for azimuth and elevation. Fixed sensors can have these reference values programmed in, while mobile sensors can determine them for a given time using a suitable inertial navigation system and image processing tools to help correct for camera motion. The imagery output 230 of these sensors is fed into detection systems 240, which use image processing techniques such as change detection and morphology to convert the imagery input into 2-D spatial characteristics 250 (e.g., azimuth and elevation angles) and features 260 (e.g., classification, size, color, shape, thermal signature, luminance, behavior over multiple observations, etc.) for each object.

Some features build from other features. Classification, for instance, involves comparing an object's known features (such as size, color, shape, etc.) to a known library of object types in order to classify the object (for example, a person or a car). In contrast, motion and behavior (such as action or intention) build up over several observations of the same object, at which point these features can be associated with the object.

The spatial characteristic 250 and feature 260 outputs feed the tracking system 270. In addition, additional sensors 280 (e.g., radar) can provide further input, whose observations 290 can be fed into the tracking system 270, either directly or with some preprocessing.

Multisensor fusion involves associating the spatial characteristics output 250 and features output 260 for an object from one sensor with the corresponding data of that object from another sensor. This allows 3-D "tracks" 300 (e.g., object vector—time, position, velocity, acceleration) and 3-D features 310 (e.g., classification, size, thermal signature, color, shape, behavior over multiple observations, etc.) to be determined by the tracking system 270. The system can form the 3-D tracks 300 through a conventional multiple hypothesis tracking technique by associating objects observed from different 2-D sensors that share similar kinematics and features.

Time is accounted for through synchronized time stamps from a common reference clock, though it is not required that each sensor capture images at the same time. By accounting for time, the movement of the object with respect to each 2-D sensor can be determined and then combined with that of other sensors (through triangulation) to produce a 3-D track for that object. Likewise, the associated 3-D features 310 can be obtained by combining the 2-D features 260 from multiple sensors that represent the same object and, in some cases, comparing the results against a library of potential features or shapes (e.g., automobile, pedestrian, etc.) to help with the classification. The output of the fusion process—the 3-D track output 300 and associated features output 310—is then fed to the behavioral analysis and alerting system, as described below in reference to FIG. 3.

Figure 3:
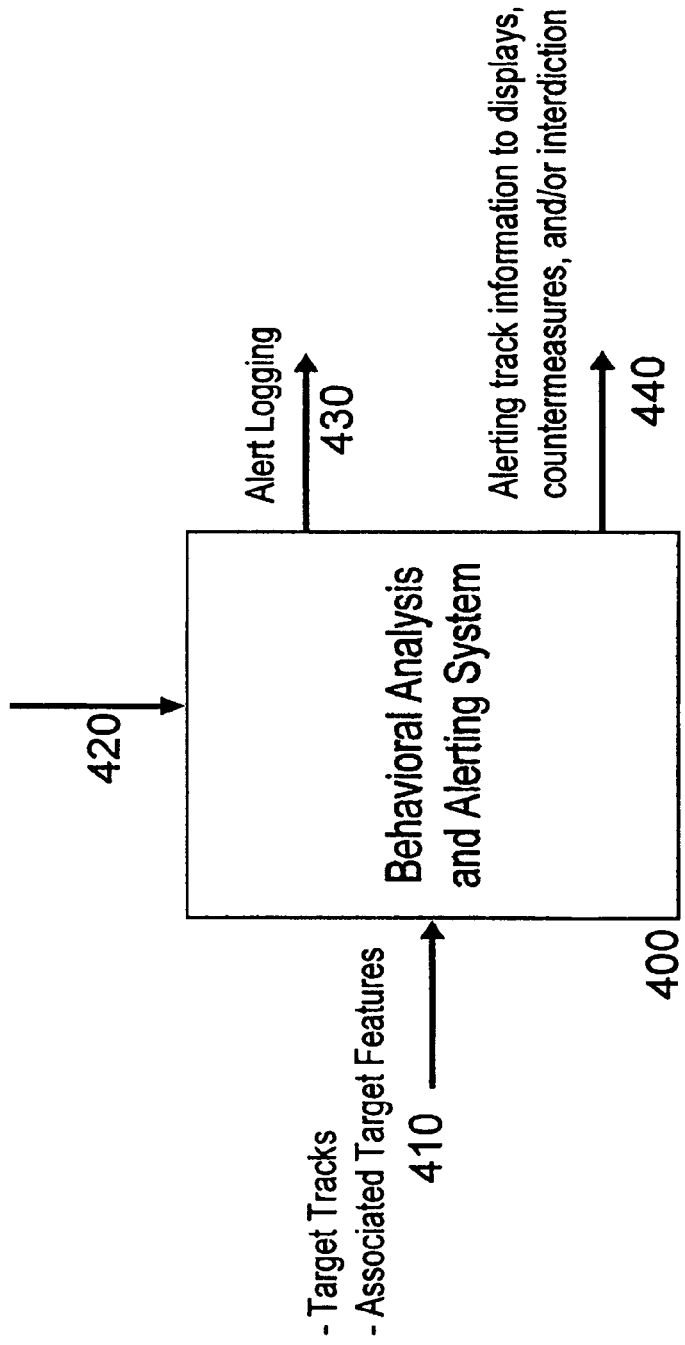
FIG. 3 is a functional block diagram illustrating an exemplary embodiment showing various inputs and outputs of a behavior analysis and alerting subsystem of the present invention.

FIG. 3 is a high-level depiction of an exemplary behavioral analysis and alerting system 400 for tracking potential targets in a military or security-type setting. The system 400 takes the target tracks and associated target features output 410 from the tracking system (270 in FIG. 2) as well as behaviors of interest 420, and outputs alert logging data 430 and alerting information 440 to appropriate destinations, such as display screens, security personnel, and automatic countermeasures. Behaviors of interest 420 can be preselected or dynamically defined, and include combinations of track characteristics or features such as 3-D region, time frame, kinematics (motion), target classification, behavior, size, color, shape, luminance, action over multiple images, etc.

Figure 4:
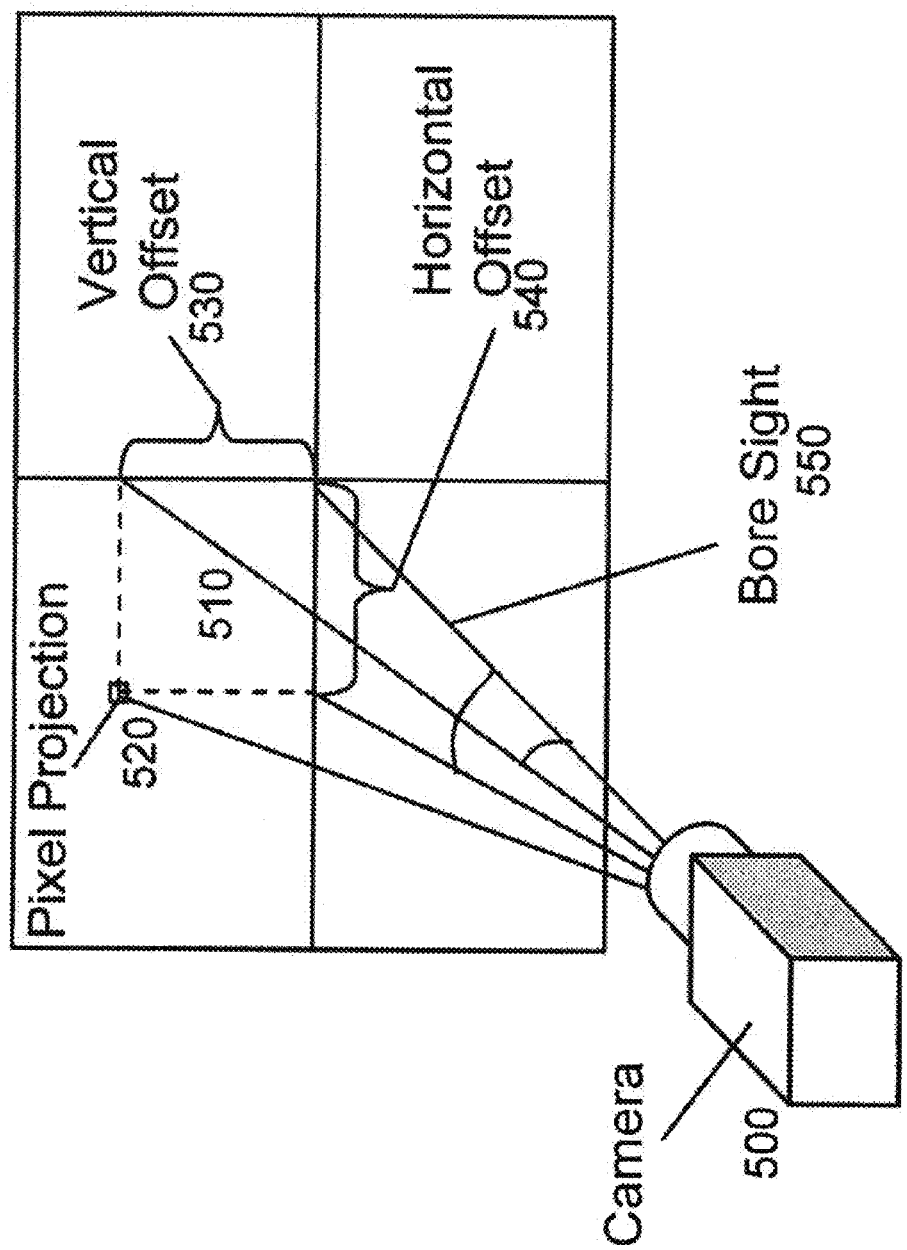
FIG. 4 is a schematic representation of the 2-D field of view of a sensor (camera, in this example) view to the area under observation in another embodiment of the invention.

FIG. 4 illustrates an exemplary process for initializing a sensor, in this case mapping a camera's field of view (FOV). Each zoom setting produces a different FOV 510 of each camera 500. That means that for every pixel 520 of the focal plane there is a direct mapping of a vertical angular offset 530 and a horizontal angular offset 540 with respect to the camera bore sight 550. This can be achieved by several methods including setting and aligning the camera 500 in front of a known grid pattern at a known distance from the pattern and generating functions via curve fitting methods that result in angular offsets 530 and 540 from the camera bore sight 550 for every camera pixel location 520, as depicted in FIG. 4. This essentially orthorectifies the camera FOV 510 and corrects for effects such as "barrel distortion" and "pincushion" as well as camera optic asymmetries or irregularities.

Camera FOV mapping is typically done only once for each camera before installing the camera or at any time when the camera optics change resulting in a new FOV 510. If the camera FOV for a particular camera type and zoom setting is highly repeatable, then all cameras of the same type and zoom setting may use a representative camera's FOV mapping, eliminating the need to map each camera separately.

Figure 5:
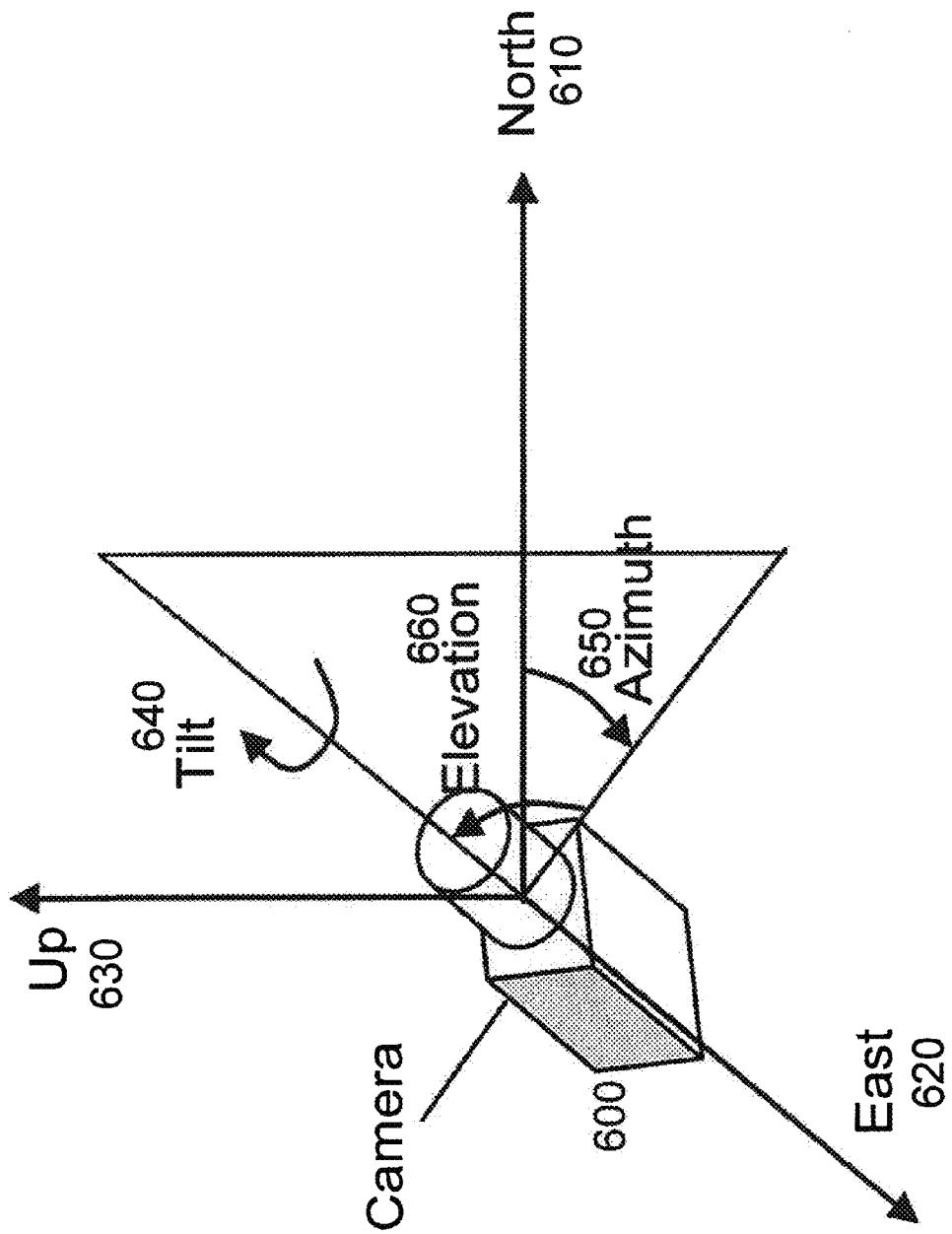
FIG. 5 is a schematic representation showing an exemplary reference orientation used to spatially orient a sensor (in this case, a camera) in accordance with an embodiment of the invention.

FIG. 5 depicts an exemplary spatial orientation of a sensor, in this case a camera 600. The system should know the camera bore sight orientation with respect to a locally level frame with a north-south axis 610, an east-west axis 620, and vertical axis 630, as well as the roll angle (tilt) 640 about the bore sight.

Several known methods can provide this orientation information. For fixed camera installations, each camera orientation can be directly measured or computed. A direct measurement approach can utilize angle-measuring sensors attached to the camera 600. A computed approach may entail the use of the location (latitude, longitude, and altitude) of several geo-registered points in the camera FOV, the geo-registered camera location, and the FOV mapping information (obtained by the camera FOV initialization method described above in relation to FIG. 4) to provide the exact orientation of the camera. The result of this process is the direct translation of each camera pixel to an azimuth value 650 and an elevation value 660 in the locally level coordinate frame centered at the camera, as illustrated in FIG. 5.

Figure 6:
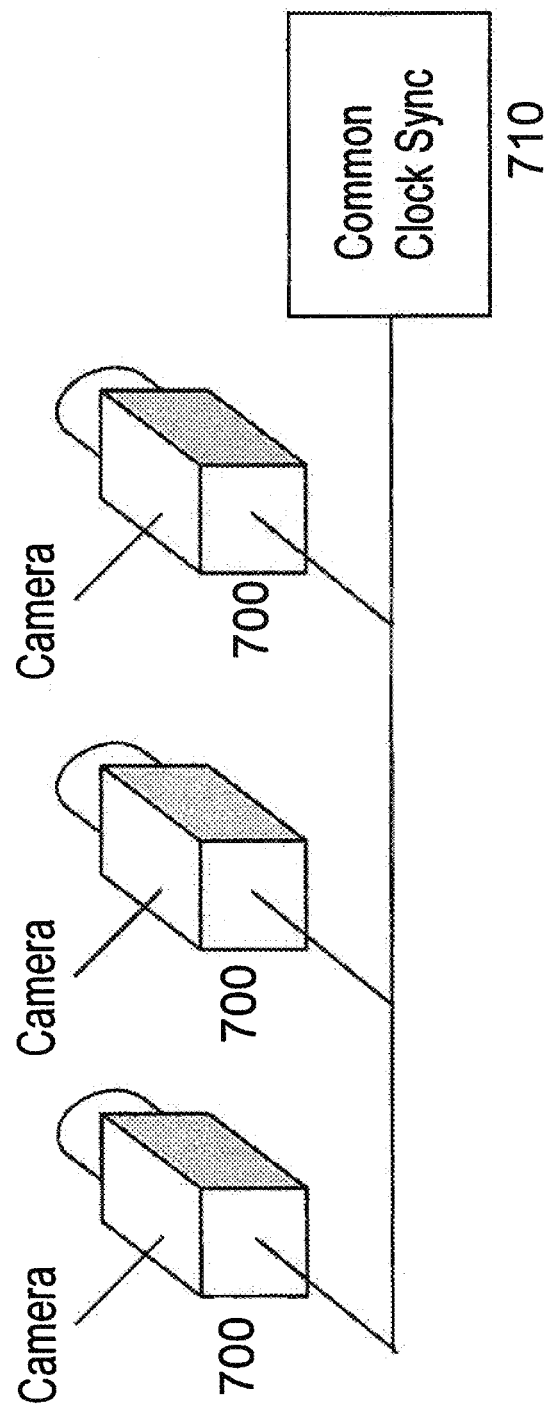
FIG. 6 is a schematic representation of time synchronizing multiple sensors, which makes it possible to combine their corresponding observations with respect to moving objects in accordance with an embodiment of the invention.

FIG. 6 shows an exemplary time synchronization arrangement for the sensors, in this case cameras 700. In this embodiment, a common clock 710 synchronizes the sensors. In one embodiment, the clock 710 may be the clock of a network computer server commonly used by the sensors to process the imagery, generate tracks, or generate alerts. Since the invention involves tracking moving objects, time is an implicit dimension (in addition to the three spatial dimensions).

Sensors do not have to record images at precise times. Nevertheless, there does need to be a reference time associated with each image. This reference time should be synchronized with those of other images, though it is not necessary that the different sensors record images at the same time. The reference time allows the tracking system to process the corresponding image data in the correct order as well as to accurately track the kinematics of the moving objects being observed.

Figure 7:
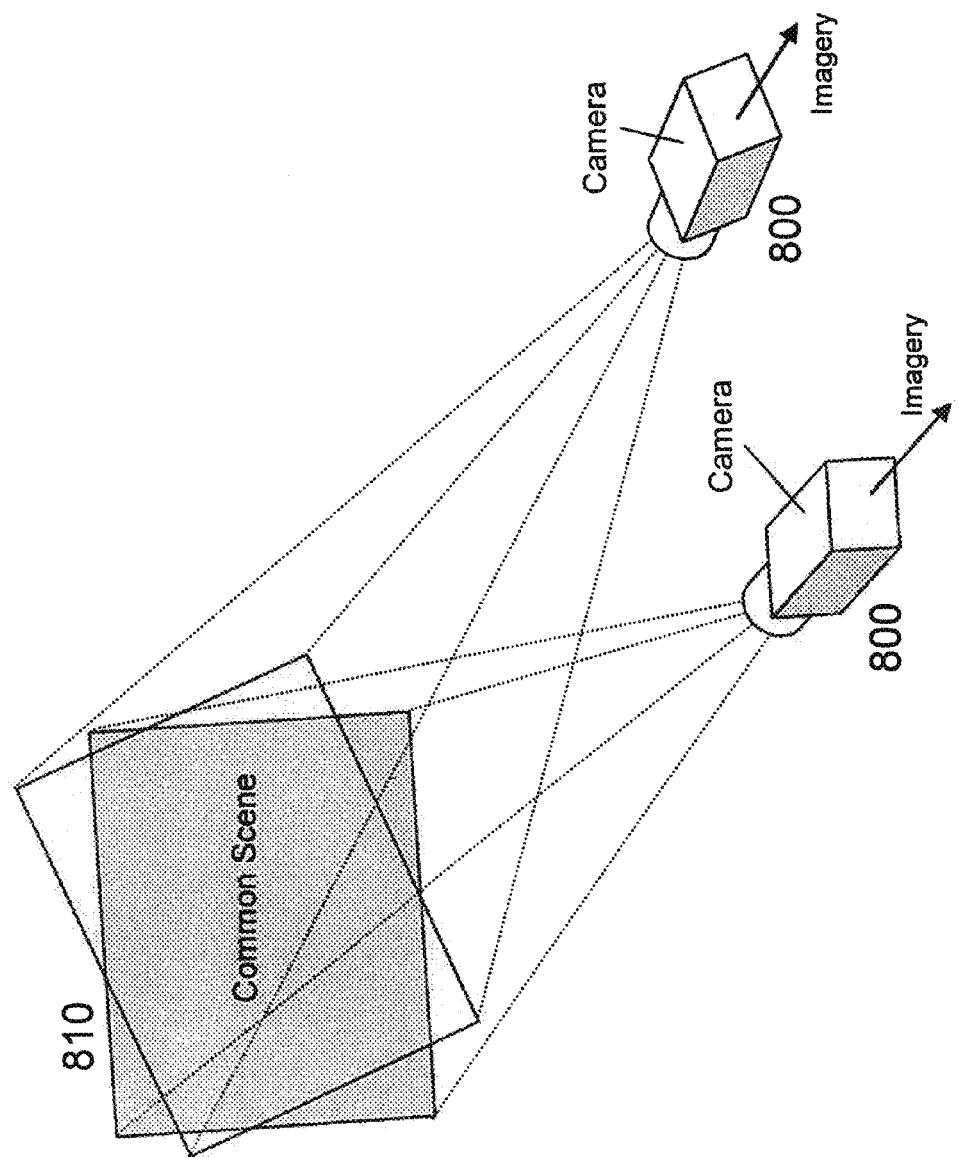
FIG. 7 is a schematic representation illustrating multiple 2-D sensors with overlapping fields of view, as exemplified in an embodiment of this invention.

FIG. 7 illustrates an exemplary arrangement of a pair of 2-D sensors 800 (cameras, in this case) with overlapping FOVs 810. The system utilizes multiple sensors that generate observations of the targets of interest. The sensors can be of any known passive design, including but not limited to visual range cameras, infrared cameras, multi-spectral cameras, hyper-spectral cameras, or may be active sensors such as radar. The exemplary system includes two or more cameras with adequate spatial separation from each other but viewing a common area of interest.

The cameras can operate asynchronously and at different frame rates but they need to be spatially oriented, time synchronized, and have a known FOV, as described above. The cameras can output time-stamped images (compressed or uncompressed) and send them via the network as input to the detection system. If 3-D radar supplements the system, its observations can directly feed into the tracking system.

Figure 8:
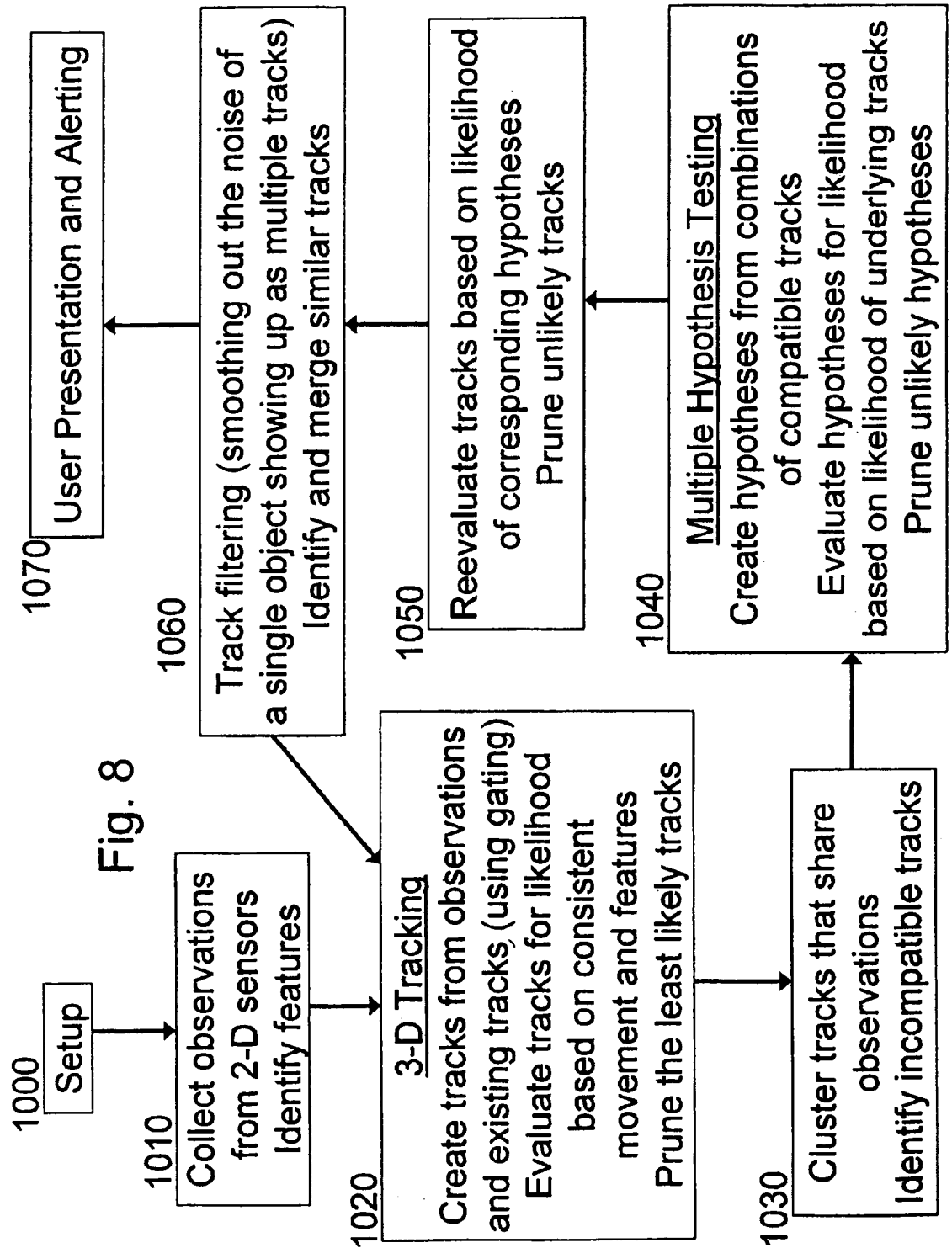
FIG. 8 is a diagram illustrating the process flow of an exemplary multiple hypothesis tracking method used in forming 3-D tracks as part of multisensor fusion in one embodiment of the invention.

FIG. 8 illustrates the flow of an exemplary multiple hypothesis tracking (MHT) approach to perform 3-D tracking from the 2-D (and other) sensor observations. While FIG. 8 illustrates the MHT methodology in its essential elements and for the level of detail required for a worker in the art to implement the method, FIGS. 9-16 describe the approach in more detail (as does the Blackman reference cited above and incorporated here by reference).

After setup 1000 of the various components (described elsewhere in more detail), MHT starts with the collection of observations from 2-D sensors 1010. The sensors collect images of their field of view. Image processing (IP) techniques process these images to form 2-D spatial representations of the observed objects. Each such observation represents a single object, and includes both kinematic (motion-related, such as location relative to the sensor and a time stamp of when the image was recorded) and feature (e.g., size, shape, color, thermal signature, classification, behavior over multiple observations, etc.) data. Some of this data builds over time and several observations, such as motion, action, behavior, and intention.

MHT is a recursive procedure, done in rounds. A round begins with 3-D track formation 1020. A track is a set of observations that are all assumed to represent the same object. Periodically throughout the data collection, the system processes new observations with the existing 3-D tracks. At first, each new observation is a track, but the observation may also be part of one or more existing tracks. The system uses gating to limit the number of possible existing tracks to which the new observation may belong. In addition, the system evaluates all tracks for likelihood, based on factors like consistent motion and features across the different observations. At this point, the system discards (prunes) the least likely tracks. Pruning is necessary throughout the MHT process to keep the real-time computation requirements within practical limits.

The next step is clustering 1030, where the system groups tracks that share common observations and ranks the tracks within each group by likelihood. Such tracks are termed incompatible, in that no more than one of them can represent an actual object. This leads to the hypothesis stage 1040, where the system builds hypotheses (sets of compatible tracks, each set corresponding to an actual object). The system evaluates the likelihood of each such hypothesis based on the likelihood of their corresponding tracks, discarding unlikely hypotheses. The system then reevaluates each track 1050 by combining the likelihoods of the corresponding hypotheses to which the track belongs. This leads to another pruning of unlikely tracks, including those tracks not belonging to any surviving hypothesis).

What remains at this point are the most likely tracks (object representations, based on sets of observations as recorded by the sensors). Many of these tracks are incompatible, primarily because they represent the same object, only with slight discrepancies in which particular observations make up the representation. Filtering and merging 1060 is the final stage of the MHT processing. This is where the system identifies similar tracks (those likely to represent the same object). The system merges each set of similar tracks into a single (e.g., the most likely) track, with the corresponding likelihoods combined into a single likelihood. The system then identifies the most likely tracks, as well as the expected number of objects, and passes the most likely tracks to the user presentation and alerting logic 1070 to both display and analyze the tracks and to alert of any activity of interest. This also marks the end of a round of MHT processing, so those tracks surviving are predicted ahead (for gating purposes) and processing advances to the next round 1020 and the cycle repeats itself with the next set of observations 1010.

Figure 9:
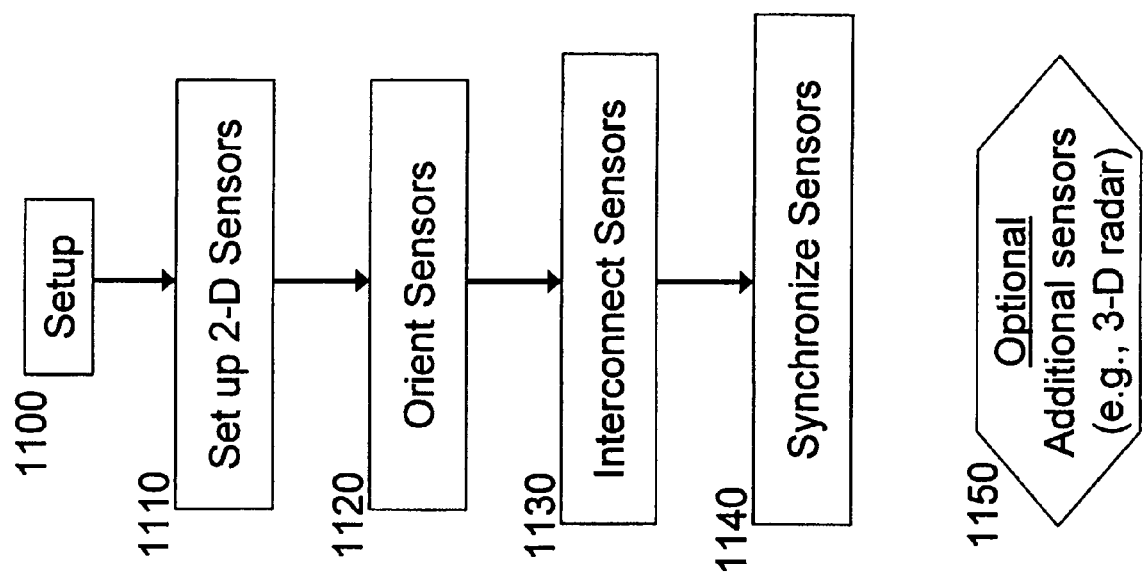
FIG. 9 is a diagram illustrating the setup process of an exemplary system for real-time 3-D object tracking and alerting by networked sensors.

FIGS. 9-16 more carefully describe the individual components in FIG. 8. FIG. 9 shows an example setup 1100. It consists of setting up the 2-D sensors 1110 (e.g., electro-optical or infrared cameras). Ideally, all areas of interest being observed need to be in the field of view (FOV) of at least two such sensors. Each such sensor produces, at any given moment, a vector to any object in its FOV. Combining two such nonoverlapping vectors (representing the same moment in time) through triangulation produces accurate 3-D tracking. Additional 2-D sensors improve this accuracy, and help with redundancy in case of sensor failure or when one sensor's FOV is obscured (say by another object).

After placing the sensors, the setup should determine their precise orientation. For a camera, this amounts to mapping each pixel in the camera's FOV to a corresponding 3-D vector (azimuth and elevation angles) originating from the camera's location. Next, the setup should connect the sensors by a network 1130. Real-time 3-D tracking involves combining the observations of multiple spatially separated sensors in relatively close time proximity. A network, be it wired or wireless, permits this data sharing under such tight time constraints. Finally, the sensors should be time-synchronized 1140. Time is an implicit fourth dimension when tracking moving objects in three dimensions, so it improves accuracy when a common temporal reference point is available to each of the sensors. Each sensor time stamps each of their corresponding observations before the tracking processor processes them.

Note that while not required, additional sensors 1150 (e.g., 3-D radar) can also be present, whose observations can be combined with those of the 2-D sensors to improve the tracking process. These sensors can be set up using a similar setup procedure to the other sensors.

Figure 10:
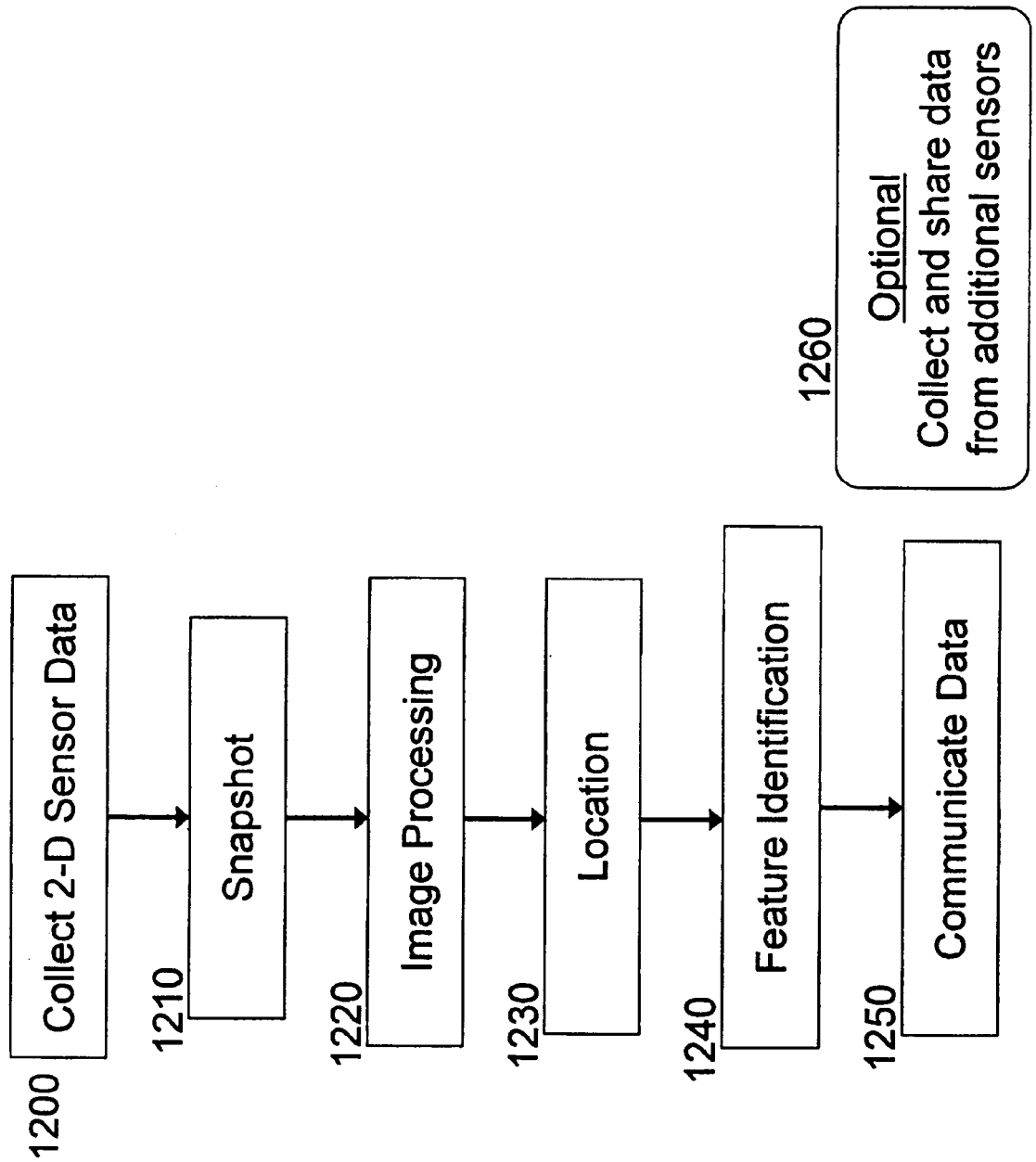
FIG. 10 is a diagram showing the process flow of the sensor data collection and initial processing of the imagery data before being input to the tracking processor in an exemplary embodiment of the invention.

FIG. 10 shows the process flow for collecting 2-D sensor data 1200. Periodically, each 2-D sensor captures its field of view 1210 (FOV) as an image along with a time stamp. The time stamp permits the system to simulate an object's motion by connecting the object's observations with their corresponding times. Each image is processed using image processing tools 1220 (including morphological operations like erosion, dilation, opening, and closing) to identify the different objects being captured in the image. Each such object representation is called an observation, and it is these observations that become the foundation of the 3-D tracking. There is an assumption throughout the tracking process that each observation belongs to exactly one object.

Next, the image processor determines the center of each observation 1230. As an observation might span many pixels, using a consistent reference point to track the object improves the precision in tracking the object's kinematics (motion). This results in a 3-D vector from the sensor to the object, which the system combines later with another such vector from a different sensor using triangulation to locate the object's precise 3-D location.

In addition to location, the image processor identifies other features 1240 of the object (e.g., color, size, shape, thermal signature, luminance, classification, etc.) based on the type of sensor. The system tags these features with the observation and uses them with associating the object to other observations of the same object (to determine other features such as the object's motion, action, behavior, or intention) as well as with alerting and doing 3-D fusion of multiple 2-D features from different sensors (for instance, determining the object's actual size). Finally, if necessary, the image processor shares these observations across the network 1250 with the tracking processor to permit 3-D tracking in real-time of the objects captured in the images. In addition, other sensors (for example, 3-D radar) can share their data 1260 with the tracking processor, often with little overhead. This data is used to aid in tracking, providing additional accuracy and confidence in the 2-D sensor data and the associated tracks.

Figure 11:
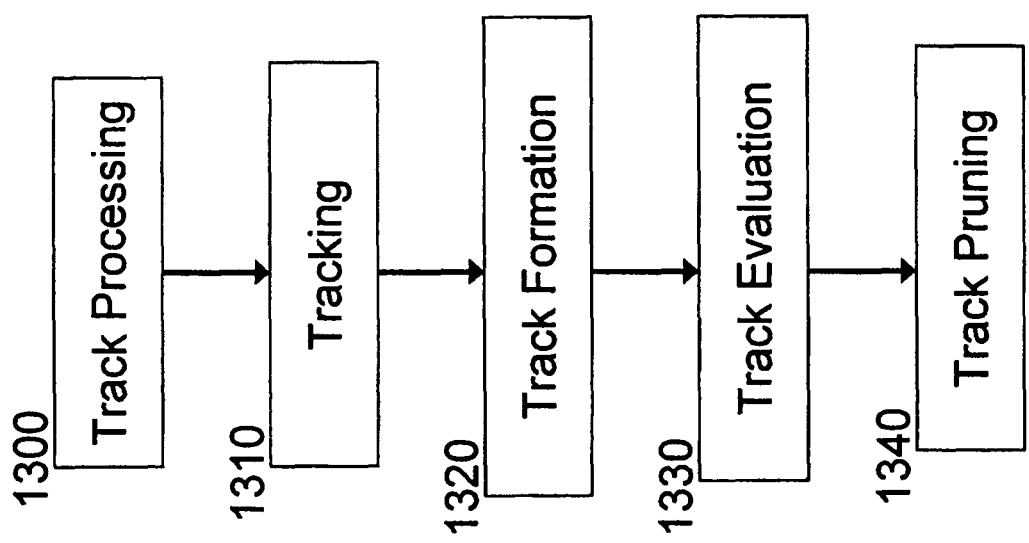
FIG. 11 is a diagram showing the process flow of an exemplary tracking processor creating and maintaining the 3-D tracks used to represent the observed objects.

FIG. 11 shows the track processing 1300 in more detail. Tracks 1310 are sets of observations intended to represent the same real-life object. Over time, several sensors can capture each object in numerous images. 3-D tracking is primarily the association of the corresponding observations from these images that represent the same object. The goal is to assemble every observation that represents a particular object into the same unique set, or track.

Tracks are formed 1320 as the beginning of a round of tracking processing, when the next set of observations are ready for processing. Each new observation could conceivably be a track by itself, if the observation represents the first time that a sensor captures the object. The observation could also be part of any of the existing tracks (from earlier rounds). New observations from different sensors could also represent the same object, so the tracking processor should consider those combinations as well when starting new tracks or augmenting existing tracks. In fact, the number of possible tracks grows very quickly with respect to the number of new observations.

One way to control this growth in the number of tracks is to use a technique known as gating. Established tracks usually represent numerous observations in close time and spatial proximity. Consequently, the movement (kinematics) and features of their corresponding objects are straightforward to predict for the next set of observations. Gating is the prediction of such observations. Gating entails estimating within a reasonable likelihood what the next observations of that object will look like, given the previous observations. That way, when adding a new observation, the only existing tracks to consider are those tracks that predict the new observation. This is usually a considerably smaller subset of existing tracks.

Gating is only a rough approximation. Throughout the tracking, much of the processing involves a repeated theme: consider every likely alternative, but continually prune alternatives that are or become unlikely. Gating restricts the forming of clearly unlikely tracks. The next step is evaluating 1330 all the tracks that survive the gating. This evaluation involves a comparison of kinematics and features among the different observations that make up a track, looking for consistency, and evaluating the likelihood of one object being the source of all those observations. A single inconsistent observation can significantly lessen the likelihood of the track.

One broad determination done at this point is the separation of tracks into two groups: likely (that is, more likely than random chance that the observations making up each track could represent the same object) and unlikely (less likely than random chance that the observations making up each track could represent the same object). The tracking processor can 1340 prune (discard) the least likely of the unlikely tracks. What remains after all this track processing 1300 is a set of tracks (incorporating the newest observations), each track of which represents a particular object, with the likelihood of each track determined and only those tracks likely enough that they could be the best representations of their corresponding objects actually kept.

Figure 12:
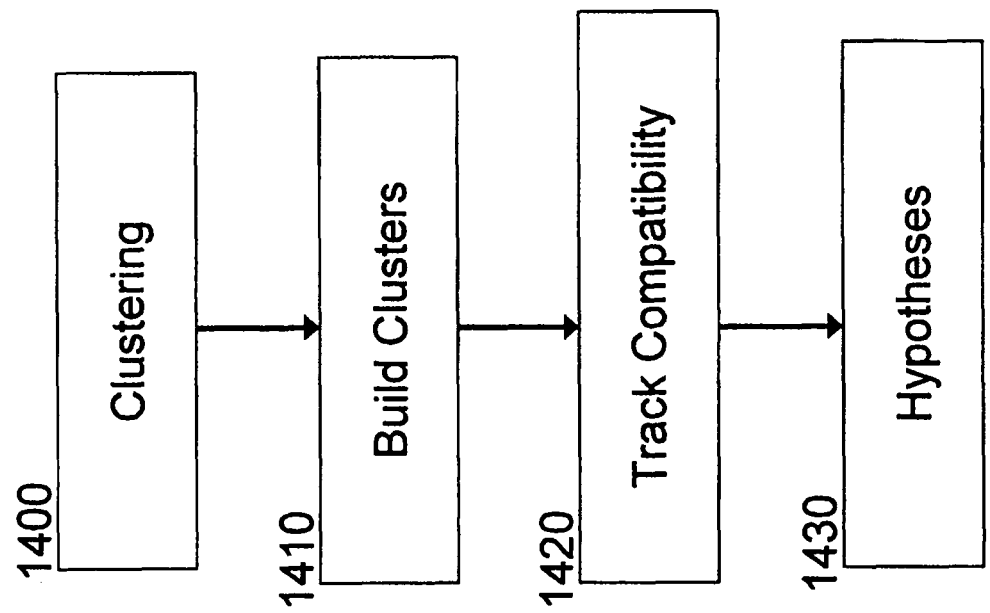
FIG. 12 is a diagram illustrating the process flow of the next stage of track processing—clustering—in preparation for forming hypotheses in accordance with an embodiment of the invention.

FIG. 12 shows the clustering process 1400 in more detail. The numerous tracks under consideration are composed of many of the same observations. A cluster 1410 is a set of tracks sharing a common observation. Because we assume an observation represents only one object, at most one track in any cluster actually represents an object. Thus, to simplify processing, within each cluster, the tracking processor can order tracks by likelihood.

Clustering helps with a phenomenon known as track compatibility 1420. Tracks are compatible if they do not share any common observations, that is, they do not belong to the same cluster. Clustered tracks are therefore incompatible. Incompatible tracks cannot represent different objects, while compatible tracks can represent different objects. This leads into hypotheses 1430, which are sets of compatible tracks. A hypothesis is a possible assignment of observations to different objects. A hypothesis is analogous to the track (a set of "compatible" observations), only a hypothesis attempts to account for all the objects being observed (that is, a set of compatible tracks) instead of only a single object. Much of hypothesis processing is analogous to track processing.

Figure 13:
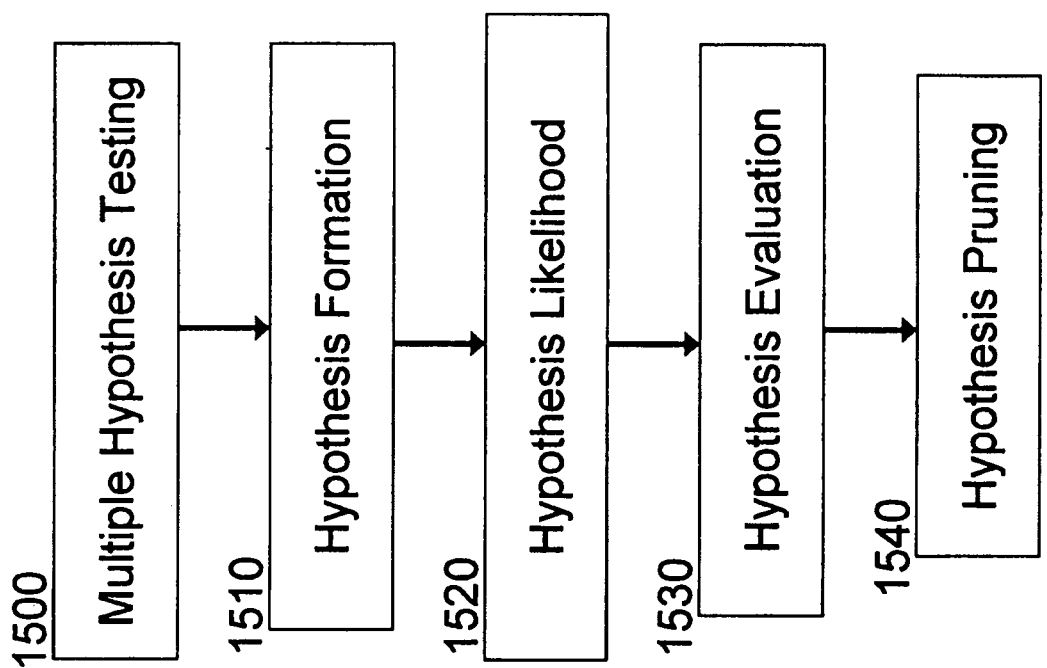
FIG. 13 is a diagram illustrating the flow of multiple hypothesis processing, from creation through pruning, in an exemplary embodiment of the invention.

FIG. 13 shows some more detail behind the next stage, multiple hypothesis tracking 1500 (MHT). The tracking processor forms hypotheses 1510 one track at a time, starting with the most likely tracks, until the hypotheses can accept no more tracks (each new track must be compatible with all of the other tracks already in the hypothesis). As with tracks, hypotheses have a likelihood 1520, which is composed of the likelihoods of their corresponding tracks. Likely tracks increase the likelihood of the hypothesis, while unlikely tracks decrease the likelihood.

Since the most likely tracks are assigned first (breadth-first), the most likely hypotheses are formed first. This way, hypothesis formation can continue until enough of the most likely hypotheses have been formed 1530 that the likelihood that any remaining hypotheses might be the correct representation of the different objects under observation is sufficiently small that those hypotheses do not have to be considered. For instance, the process could end after forming, say, the hundred most likely hypotheses. Alternatively, it could end when the difference in likelihood between any remaining unformed hypotheses and the most likely hypothesis is so large that it is safe to ignore the unformed hypotheses. Regardless, the tracking processor prunes the least likely hypotheses 1540 if they are not sufficiently likely to warrant further consideration.

Figure 14:
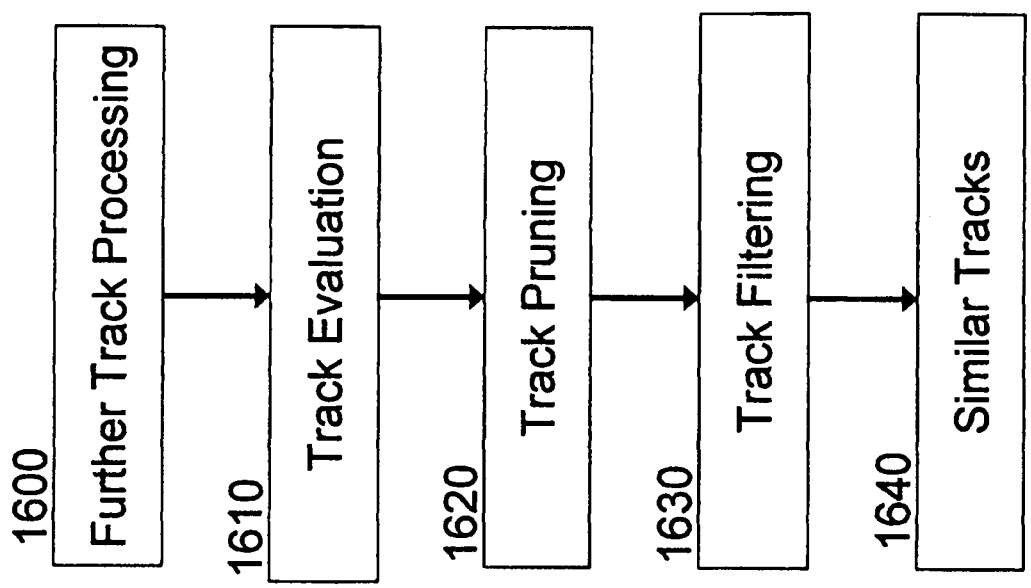
FIG. 14 is a diagram showing an example process flow of the third stage of track processing, where the system reevaluates tracks based on the results of the hypothesis creation and pruning, and filtering helps identify similar tracks.

FIG. 14 shows the process flow after MHT, where further track processing 1600 takes place. First, the tracking processor reevaluates the tracks 1610, this time combining the likelihoods of all of the surviving hypotheses for which they are a member. That way, a track's new likelihood reflects its ability to be compatible with other tracks (and not just its consistency among its own observations). The tracking processor prunes less likely tracks 1620 (including those tracks that did not become part of a surviving hypothesis).

Next, the tracking processor performs common calculations 1630, especially Kalman filtering, on the remaining tracks within each cluster. Kalman filtering attempts to remove the noise (error) that is inherent in any tracking system where multiple sensors observe objects at multiple times under different circumstances, thereby resolving an object's actual location and kinematics (motion). The goal of this is to identify which tracks are similar 1640, that is, likely to represent the same object, only using slightly different sets of observations. This is a prerequisite to merging.

Figure 15:
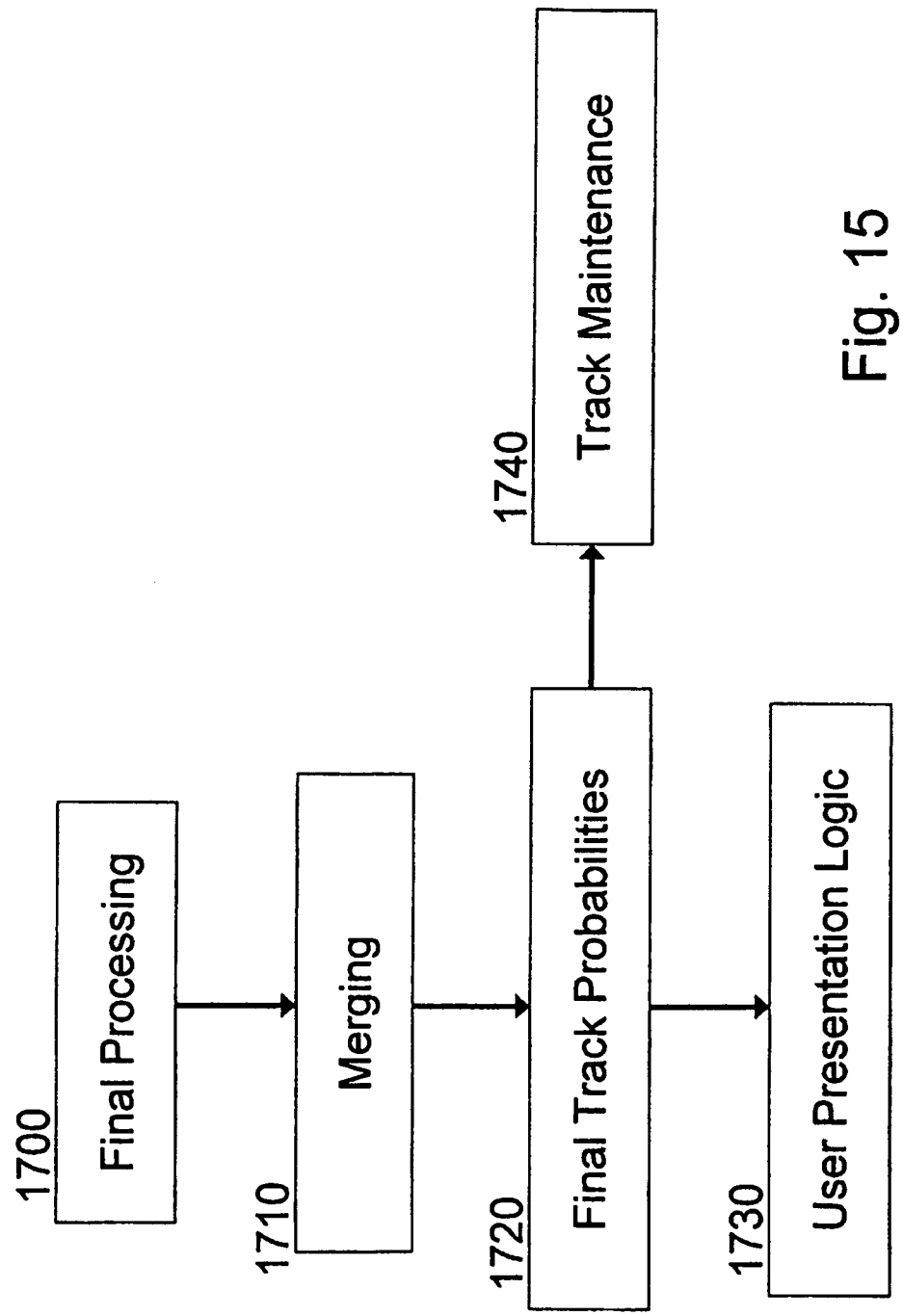
FIG. 15 is a diagram showing the process flow of an exemplary completion of a round of track processing: merging the similar tracks, outputting the most likely ones to the user, and predicting the next observations in anticipation of processing the next round of observation data.

FIG. 15 shows the last steps of MHT processing 1700. First, the system merges similar tracks 1710. For each group of similar tracks (representing the same object), the system keeps the most likely track and discards the others, while combining the likelihoods of all the tracks in the group to represent the likelihood of the one remaining track. This compensates objects that are in congested areas (and that generate multiple possible tracks from the various observations), keeping them on a more equal footing with those objects in less congested areas.

After merging, the system computes the final track probabilities 1720. This is where the system converts the likelihoods of the remaining tracks into probabilities (of actually representing an object). This allows the system to calculate the expected number of observed objects N. This data feeds the user presentation logic 1730, which presents (roughly) the N most likely objects to the user.

Presentation is not straightforward. Since this is real-time presentation, the N most likely tracks remaining may not necessarily represent the N most likely objects. The system should not present tracks with insufficient history (that is, new tracks should wait until they have sufficient observations and rounds of processing that the system confirms them to represent real objects). Likewise, the system should not abruptly drop tracks that have sufficient history (that is, tracks presented for the last several rounds). For instance, such tracks could have their predicted paths displayed for a few rounds until the system determines their corresponding objects' true whereabouts with more certainty. Presentation should portray continuous movement of the expected number of objects through predictable paths. This necessitates a certain amount of factoring in what was last presented when deciding what new data to present (that is, smoothing) so as not to confuse security personnel monitoring the real-time tracking.

Concurrent with presentation is track maintenance 1740, where the system predicts the most likely tracks ahead to the next round of observations. That is, these tracks will become the building blocks for the next round 1320 of MHT calculations (joining the next set of observations), with their kinematics predicted to the next set of observations (based on the current kinematics from combining the multiple observations and using triangulation to formulate 3-D paths). These predictions help with deciding which new observations are likely to represent continuations of the existing tracks versus the start of new tracks.

Figure 16:
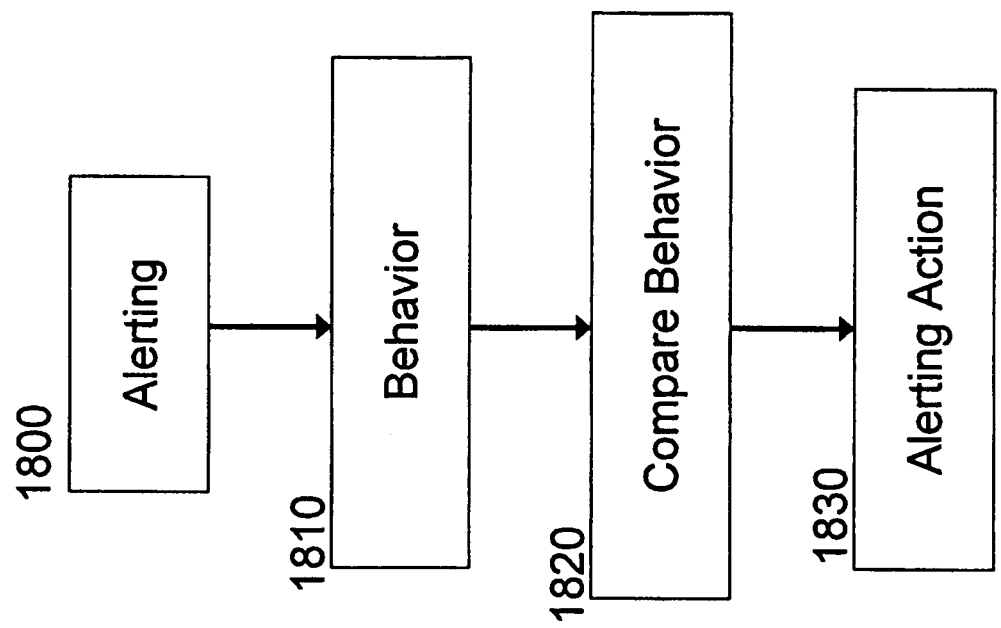
FIG. 16 is a diagram depicting an exemplary alerting process flow in response to the newest round of tracking data according to one embodiment of the invention.

FIG. 16 shows the alerting process 1800, another part of user presentation. Alerting involves behaviors 1810, that is, predefined object movements and features of interest. For instance, alerts can be based on object size (say, when a human-sized figure enters a field of view, but not a bird-sized figure) or color (for example, a white shirt, a yellow car). Alerts can also be based on three-dimensional motion or behavior (i.e., action derived from multiple observations, such as entering a building, crossing a street, etc.) or any combination of features and behavior. Each object identified (by final track, or set of observations) is then compared 1820 to these behaviors to see if the object's corresponding movement and features match those of the behaviors'.

Finally, if the system finds a match, it takes appropriate alerting actions 1830. These can include notifying appropriate security personnel, cueing a pan-tilt-zoom (PTZ) camera on the target (object of interest), turning on lights, or setting off alarms. By precisely defining the behaviors, security personnel are better able to handle potentially threatening situations versus prior art systems, where alerts are too frequent and are so often false alarms that security personnel stop paying them enough attention to consistently deal with them appropriately.

The foregoing description has provided by way of exemplary and non-limiting examples a full and informative description of the exemplary embodiments of this invention. However, various modifications and adaptations may become apparent to those skilled in the relevant art in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An object detection and tracking system of a three-dimensional (3-D) space, the system comprising:
   a network for interconnecting components of the system;
   a common reference clock connected to the network and configured to provide time stamps to the components of the system;
   two or more spatially separated two-dimensional (2-D) sensors connected to the network and having overlapping fields of view of the 3-D space for detecting and 3-D tracking of one or more moving objects in the 3-D space through concurrent time-stamped 2-D observations, each point in the 3-D space being observable by at least two of the 2-D sensors;
   at least one image processor connected to the network and for converting each 2-D sensor's time-stamped 2-D observations into time-stamped 2-D spatial characteristics and for extracting 2-D feature data of the one or more moving objects;
   at least one tracking processor connected to the network and for combining the time-stamped 2-D spatial characteristics and the 2-D feature data from respective said 2-D sensors into time-stamped 3-D spatial characteristics through triangulation and then fusing the time-stamped 3-D spatial characteristics and the 2-D feature data from the respective 2-D sensors into 3-D tracks comprising 3-D kinematic data, and into 3-D feature data of the one or more moving objects; and
   at least one behavior analysis and alert processor connected to the network and for analyzing the 3-D kinematic and feature data and generating appropriate alerts corresponding to 3-D behaviors of interest.

2. The system of claim 1 further comprising at least one display connected to the network and for presenting the 3-D kinematic and feature data.

3. The system of claim 2, wherein the at least one display is further configured to present alert data of the appropriate alerts.

4. The system of claim 1 wherein the 2-D sensors are passive electro-optical/infrared 2-D sensors.

5. The system of claim 1 further comprising one or more pan-tilt-zoom (PTZ) cameras connected to the network and for object identification of the one or more moving objects, wherein the one or more PTZ cameras can be activated automatically or from operator input to track a particular one of the one or more moving objects.

6. The system of claim 1 further comprising at least one spatially oriented 3-D sensor connected to the network and for detecting the one or more moving objects through time-stamped 3-D observations to produce time-stamped 3-D observation data, wherein the time-stamped 3-D observation data is fed directly to the at least one tracking processor.

7. The system of claim 1 wherein the 2-D sensors are calibrated with respect to their corresponding said fields of view and spatially oriented with respect to their observation points of the 3-D space.

8. The system of claim 1 wherein the system processes the data in real time.

9. An object detection and tracking method of a three-dimensional (3-D) space, the method comprising:
   spatially separating two or more two-dimensional (2-D) sensors having overlapping fields of view of the 3-D space, each point in the 3-D space being observable by at least two of the 2-D sensors;
   interconnecting the 2-D sensors, a common reference clock, and at least one processor to a network, the common reference clock being configured to provide time stamps to the 2-D sensors; and
   detecting and 3-D tracking, by the at least one processor, of one or more moving objects in the 3-D space, comprising:
      collecting concurrent time-stamped 2-D observations from the 2-D sensors;
      converting each sensor's time-stamped 2-D observations into time-stamped 2-D spatial characteristics and extracting 2-D feature data of the one or more moving objects;
      combining the time-stamped 2-D spatial characteristics and the 2-D feature data from respective said 2-D sensors into time-stamped 3-D spatial characteristics through triangulation;
      fusing the time-stamped 3-D spatial characteristics and the 2-D feature data from the respective 2-D sensors into 3-D tracks comprising 3-D kinematic data, and into 3-D feature data of the one or more moving objects; and
      analyzing the 3-D kinematic and feature data, and generating appropriate alerts corresponding to 3-D behaviors of interest.

10. The method of claim 9 further comprising:
    connecting a display to the network; and
    displaying the 3-D kinematic and feature data on the display.

11. The method of claim 10 further comprising displaying alert data of the appropriate alerts on the display.

12. The method of claim 9 wherein the 3-D tracking further comprises:
    creating the 3-D tracks directly from new time-stamped 2-D observations and existing ones of the 3-D tracks;
    evaluating the 3-D tracks for likelihood based on consistent said 3-D kinematic and feature data; and
    pruning least likely ones of the 3-D tracks.

13. The method of claim 12 wherein the 3-D tracking further comprises:
    clustering ones of the 3-D tracks that share ones of the time-stamped 2-D observations and
    identifying incompatible ones of the 3-D tracks.

14. The method of claim 13 wherein the 3-D tracking further comprises multiple hypothesis testing, the multiple hypothesis testing comprising:
    creating hypotheses from combinations of compatible ones of the 3-D tracks;

evaluating the hypotheses for likelihood based on likelihood of corresponding said combinations of the compatible ones of the 3-D tracks; and pruning unlikely ones of the hypotheses.

15. The method of claim 14 wherein the 3-D tracking further comprises:

reevaluating the 3-D tracks for likelihood based on likelihood of corresponding said hypotheses and pruning unlikely ones of the 3-D tracks.

16. The method of claim 15 wherein the 3-D tracking further comprises 3-D track filtering, the 3-D track filtering comprising:

identifying similar ones of the 3-D tracks likely to represent a same object of the one or more objects; and merging the similar ones of the 3-D tracks into a single 3-D track that represents the same object.

17. The method of claim 9 further comprising processing the data in real-time.

18. The method of claim 9 further comprising:

connecting one or more pan-tilt-zoom (PTZ) cameras to the network;

selecting one or more of the moving objects; and tracking, by the at least one processor, the selected one or more of the moving objects on the one or more PTZ cameras.

19. The method of claim 9 further comprising:

connecting at least one 3-D sensor to the network;

spatially orienting the at least one 3-D sensor with respect to a corresponding at least one observation point of the 3-D space;

collecting time-stamped 3-D observations from the at least one 3-D sensor; and fusing the time stamped 3-D observations into the 3-D kinematic and feature data.

20. The method of claim 9 further comprising:

calibrating the 2-D sensors with respect to their corresponding said fields of view; and spatially orienting the 2-D sensors with respect to their observation points of the 3-D space.

* * * * *